(12) United States Patent
Zhang et al.

(10) Patent No.: US 11,134,697 B2
(45) Date of Patent: Oct. 5, 2021

(54) PREPARATION METHOD OF INSTANT BONE MILK

(71) Applicant: Institute of Food Science and Technology, Chinese Academy of Agricultural Sciences, Beijing (CN)

(72) Inventors: Chunhui Zhang, Beijing (CN); Wei Jia, Beijing (CN); Xiaojie Qin, Beijing (CN); Qingshan Shen, Beijing (CN); Hongru Zhang, Beijing (CN)

(73) Assignee: Institute of Food Science and Technology, Chinese Academy of Agricultural Sciences, Beijing (CN)

( * ) Notice: Subject to any disclaimer, the term of this patent is extended or adjusted under 35 U.S.C. 154(b) by 266 days.

(21) Appl. No.: 16/362,587

(22) Filed: Mar. 22, 2019

(65) Prior Publication Data
US 2020/0205432 A1    Jul. 2, 2020

(30) Foreign Application Priority Data

Dec. 27, 2018    (CN) .......................... 201811609250.X

(51) Int. Cl.
*A23C 9/18*    (2006.01)
*A23C 9/152*   (2006.01)

(52) U.S. Cl.
CPC ............... *A23C 9/18* (2013.01); *A23C 9/152* (2013.01); *A23V 2002/00* (2013.01)

(58) Field of Classification Search
CPC ........ A23C 9/18; A23C 9/152; A23V 2002/00
USPC .......................... 426/42, 55, 56, 58, 59, 641
See application file for complete search history.

*Primary Examiner* — Leslie A Wong
(74) *Attorney, Agent, or Firm* — CBM Patent Consulting, LLC

(57) ABSTRACT

The present invention discloses a preparation method of instant bone milk, including: washing edible animal bones and then crushing, adding a certain amount composite effect enhancer, performing two high pressure hydrolysis-instantaneous pressure relief in high pressure hydrolysis chamber, collecting liquid-phase materials, performing centrifugation for degreasing, wet sieving, homogenizing, spray drying to obtain powdered instant bone milk. A device for preparation method of instant bone milk comprises a high-pressure hydrolysis tank, a grading conveying pipe and a gas-liquid separator. The instant bone milk prepared by the present invention has stable chemical structure, uniform particle size distribution and regular normal distribution, high protein solubility and good solution stability. And the preparation method has simple process, low cost equipment and good versatility.

5 Claims, 4 Drawing Sheets

PREPARATION METHOD OF INSTANT BONE MILK

TECHNICAL FIELD

The present invention relates to the field of edible animal bone processing technology. More specifically, the present invention relates to a preparation method of instant bone milk and device thereof.

BACKGROUND

China's livestock and poultry bone production ranks first in the world. Animal output is as high as 17 million tons, accounting for about 29% of the world's total. Livestock and poultry bones are rich in proteins, fats, polysaccharides, minerals and other nutrients and functional active ingredients. They are an important source of various nutrients in the human body, and development and utilization value is huge. "Chinese Dietary Guidelines (2016)" and "2015 Report on Chinese Nutrition and Chronic Disease" pointed out that the intake of high-quality animal protein in the diet of Chinese residents is insufficient, acid nutrients such as calcium and iron are lacking. Efficient development and utilization of livestock and poultry bone resources and creation of new bone-source foods are great significant for promoting industrial upgrading, improving quality and efficiency, reducing resource waste and environmental pollution, and improving national nutrition and health. In 2012, GB 14880 "National Food Safety Standard and Food Nutrition Fortifier Use of Health Standards" identified bone powder as a food ingredient for the fields of functional foods, nutrition fortifier and pet foods.

At present, fresh bone needs degreasing, enzymatic hydrolysis, mechanical impact, ball milling, high-speed airflow pulverization, sieving and other processes for producing powder. The process is complicated, it takes a long time (4-30 h), the bone powder yield is low, and it is difficult to achieve large-scale production. The bone powder produced by the conventional method is difficult to dissolve, and the bone powder absorption rate is low. Problems in the preparation of bone meal based on the above, it is particularly important to explore new preparation method of bone powder.

High-pressure hydrolysis-instantaneous pressure relief technology uses water vapor as a medium to pressurize and then break the physical combination of various components of biomass materials through instantaneous pressure relief to achieve "de-organization". At the same time, it accompanies biochemical reactions and thermal reactions to achieve rapid "liquefaction" of material. The technology has the advantages of short time-consuming, energy-saving, solvent-free residue, and is suitable for large-scale production. The invention adopts the technology to prepare instant bone milk, overcomes the disadvantages of traditional process for producing powder, improves the quality of the bone powder, and expands the application range of the bone powder.

DESCRIPTION

A purpose of the present invention is to solve at least above problems, and to provide, at least, the advantages that will be described later.

Another purpose of the present invention is to provide a preparation method of instant bone milk and device thereof, which utilizes two high pressure hydrolysis-instantaneous pressure relief techniques, and performs pressure treatment with water vapor as a medium. And then water vapor enters the bone tissue, and the bone tissue is subjected to instantaneous pressure relief. The steam suddenly blasts and the volume increases sharply, thus instantly breaking the physical combination of various components of biomass materials through instantaneous pressure relief to achieve "de-organization". The release of nutrients from the bones is accompanied by biochemical reactions and thermal reactions to achieve rapid "liquefaction" of material. In addition, the composite effect enhancer is added in the process of the second high-pressure hydrolysis, wherein the composite effect enhancer comprises 1 to 3% gum arabic, 0.1 to 0.5% citric acid, 0.05 to 0.1‰ tea polyphenol, 3 to 5‰ propylene glycol fatty acid ester. By adding the composite effect enhancer, it can accelerate the emulsification of proteins and oils under the condition of high temperature instantaneous pressure relief, which is beneficial to form a stable emulsion. At the same time, the antioxidant can prevent protein oxidation; the addition of organic acid can promote the complete dissolution of free calcium in the bone, and chelate with polypeptide to form a stable state, which greatly increases the nutritionality of the product, stabilizes the chemical structure of the prepared bone powder, and uniform in particle size distribution and presents a regular normal distribution, having high protein solubility, good solution stability, simple process flow, simple operation, small equipment investment, and high efficiency, and capable of realizing large-scale production.

In view of purposes mentioned above and other advantages, the present invention provides a preparation method of instant bone milk, including the following steps: washing edible animal bones and then crushing, using high pressure hydrolysis-instantaneous pressure relief technology, placing crushed bones under the condition of steam pressure of 1.5-2.0 MPa for 5-10 minutes, performing instantaneous pressure relief, adding composite effect enhancer under the steam pressure of 1.5-2.0 MPa according to the weight percentage: 1 to 3% gum arabic, 0.1 to 0.5% citric acid, 0.05 to 0.1‰ tea polyphenol, 3 to 5‰ propylene glycol fatty acid ester, maintaining 15-20 min, performing instantaneous pressure relief, collecting liquid-phase materials after two high pressure hydrolysis-instantaneous pressure relief treatment, performing centrifugation for degreasing, wet sieving, homogenizing, spray drying to obtain powdered instant bone milk.

Preferably, the particle size of the crushed bones is 3 to 5 cm.

Preferably, the composite effect enhancer comprises according to the weight percentage: 2% gum arabic, 0.3% citric acid, 0.05‰ tea polyphenol, and 3‰ propylene glycol fatty acid ester.

Preferably, the liquid after centrifugation and degreasing is sieved and filtered through a 450-600 mesh self-cleaning filter in the wet sieving process.

Preferably, the homogenization pressure is maintained at 60-100 MPa in the homogenizing process.

Preferably, the drying temperature is 140-180 degree Celsius and the moisture content is maintained at 5 to 8% in the spray drying process.

The present invention also provides a device for preparation method of instant bone milk, comprising:

a high-pressure hydrolysis tank, comprising a hydrolysis chamber and a collection chamber penetrating from top to bottom, wherein the connection between the hydrolysis chamber and the collection chamber is provided with a quick-opening valve, the top of the hydrolysis chamber is provided with a feed port and an intake valve, the hydrolysis chamber is provided with a charging basket, and the bottom of the collection chamber is connected with a discharge pipe;

a grading conveying pipe, the inlet end of which is connected to the discharge pipe, wherein the grading conveying pipe is a tubular structure whose inner diameter is gradually increased, and the grading conveying pipe is internally provided with a three-grade sieving plate, each grade sieving plate radial setting, and providing with holes, and the diameter of each grade sieving plate is arranged along the material conveying direction according to the diameter from large to small and the distribution density from sparse to dense, and grading conveying pipe and the horizontal ground having an angle of 30-75 degrees, wherein the inlet end of the grading conveying pipe is lower than the outlet end, and the bottom of the inlet end is provided with a slag discharge port;

a gas-liquid separator, the side wall of which is in communication with the outlet end of the grading conveying pipe, the top of the gas-liquid separator is provided with an exhaust port, and the bottom is provided with a discharge port.

Preferably, the opening speed of the quick-opening valve is less than 0.1 s.

Preferably, the charging basket is made of stainless steel material, the gap between the charging basket and the hydrolysis chamber is set to 1 to 5 cm, and the surface of the charging basket is uniformly distributed with holes with diameter of 1 to 2 cm.

Preferably, the pipe diameter at the outlet of the grading conveying pipe is 1.5-2 times that at the inlet.

The present invention includes at least the following advantages:

First, the preparation method of instant bone milk according to the present invention utilizes two high-pressure hydrolysis-instantaneous pressure relief technologies to significantly improve the processing efficiency of edible animal bones, simplify the production process, and does not use solvents and enzymes and other raw materials to avoid products contamination.

Second, in the preparation method of instant bone milk according to the present invention, the composite effect enhancer is added in the process of the second high-pressure hydrolysis, wherein the composite effect enhancer comprises 1 to 3% gum arabic, 0.1 to 0.5% citric acid, 0.05 to 0.1‰ tea polyphenol, 3 to 5‰ propylene glycol fatty acid ester. By adding the composite effect enhancer, it can accelerate the emulsification of proteins and oils under the condition of high temperature instantaneous pressure relief, which is beneficial to form a stable emulsion. At the same time, the antioxidant can prevent protein oxidation; the addition of organic acid can promote the complete dissolution of free calcium in the bone, and chelate with polypeptide to form a stable state, which greatly increases the nutritionality of the product, stabilizes the chemical structure of the prepared bone powder, and uniform in particle size distribution and presents a regular normal distribution, having high protein solubility, and good solution stability.

Third, the device for preparation method of instant bone milk according to the present invention has simple operation, low equipment cost and good versatility, and is advantageous for large-scale production.

Other advantages, objects, and features of the present invention will be showed in part through following description, and in part will be understood by those skilled in the art from study and practice of the present invention.

DETAILED DESCRIPTION

The present invention will now be described in further detail with reference to the accompanying drawings in order to enable person skilled in the art to practice with reference to the description.

It should be noted that terms of "having", "containing" and "including" as used herein do not exclude presence or addition of one or more other elements or combinations thereof.

It should be noted that the experimental methods described in the following embodiments are all conventional methods unless otherwise specified, and the reagents and materials are commercially available unless otherwise specified.

Figure 1:
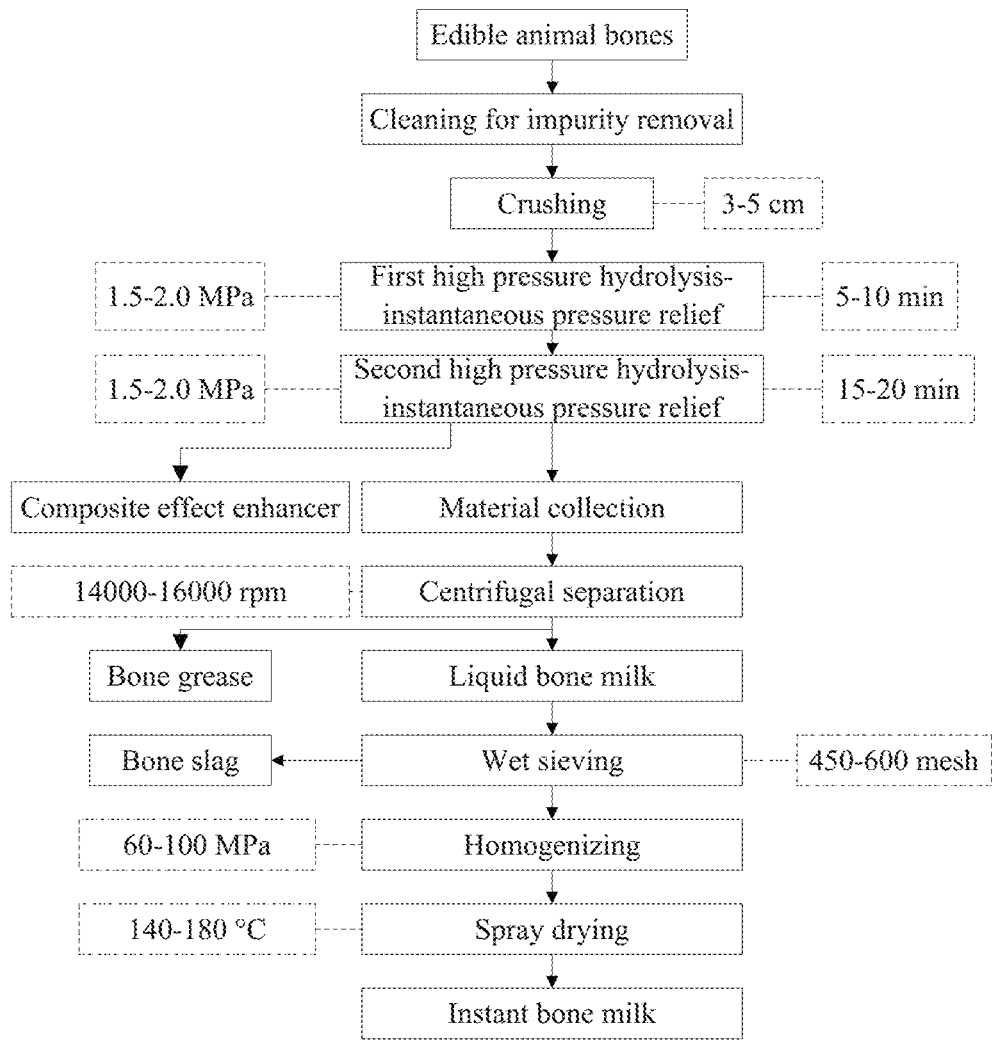
FIG. 1 is a process flow diagram of preparation method of instant bone milk according to the present invention.

The present invention provides a preparation method of instant bone milk, as shown in FIG. 1, including the following steps:

washing edible animal bones and then crushing, using high pressure hydrolysis-instantaneous pressure relief technology, placing crushed bones under the condition of steam pressure of 1.5-2.0 MPa for 5-10 minutes, performing instantaneous pressure relief, adding composite effect enhancer under the steam pressure of 1.5-2.0 MPa according to the weight percentage: 1 to 3% gum arabic, 0.1 to 0.5% citric acid, 0.05 to 0.1‰ tea polyphenol, 3 to 5‰ propylene glycol fatty acid ester, maintaining 15-20 min, performing instantaneous pressure relief, collecting liquid-phase materials after two high pressure hydrolysis-instantaneous pressure relief treatment, performing centrifugation for degreasing, wet sieving, homogenizing, spray drying to obtain powdered instant bone milk. During the first high-pressure hydrolysis process, the steam enters the inside of the raw material bone to reach equilibrium, the soluble organic part of the bone material is hydrolyzed, the calcium ions are dissolved, and the volume of the gas is suddenly increased during the instantaneous pressure relief, thereby instantaneously breaking physical combination of the components of the biomass material, opening a single chain of the triple helix structure of collagen, and releasing the nutrients in the bone, and achieving rapid "liquefaction" of the material. After the pressure relief is completed, the steam is pressurized again, and the composite effect enhancer is added according to the weight percentage: 1 to 3% gum arabic, 0.1 to 0.5% citric acid, 0.05 to 0.1‰ tea polyphenol, 3 to 5‰ propylene glycol fatty acid ester. The steam carries composite effect enhancer to penetrate into the dense bone crystal under high pressure, and loose hydroxyapatite is cracked into fine particles when instantaneous pressure relief. By adding the composite effect enhancer in the second high-pressure hydrolysis, it can accelerate the emulsification of proteins and oils under the condition of high temperature instantaneous pressure relief, which is beneficial to form a stable emulsion. At the same time, the antioxidant can prevent protein oxidation; the addition of organic acid can promote the complete dissolution of free calcium in the bone, and chelate with polypeptide to form a stable state, which greatly increases the nutritionality of the products. In addition, by adding the composite effect enhancer in the second high-pressure hydrolysis, it can effectively prevent the composite effect enhancer from being lost and difficult to work during the first instantaneous pressure relief.

In one of the embodiments, the particle size of the crushed bones is 3 to 5 cm. The particle size of the raw material bone is too large to cause liquefaction incompleteness and discoloration of the liquefied liquid; if the particle size of the raw material bone is too small, it is easy to cause problems such as high material loss rate, non-uniform liquefaction and more debris, which will affect the later filtration.

In one of the embodiments, the composite effect enhancer comprises according to the weight percentage: 2% gum arabic, 0.3% citric acid, 0.05‰ tea polyphenol, and 3‰ propylene glycol fatty acid ester.

In one of the embodiments, the liquid after centrifugation and degreasing is sieved and filtered through a 450-600 mesh self-cleaning filter in the wet sieving process.

In one of the embodiments, the homogenizing pressure is maintained at 60-100 MPa in the homogenizing process.

In one of the embodiments, the drying temperature is 140-180 degree Celsius and the moisture content is maintained at 5 to 8% in the spray drying process.

Figure 2:
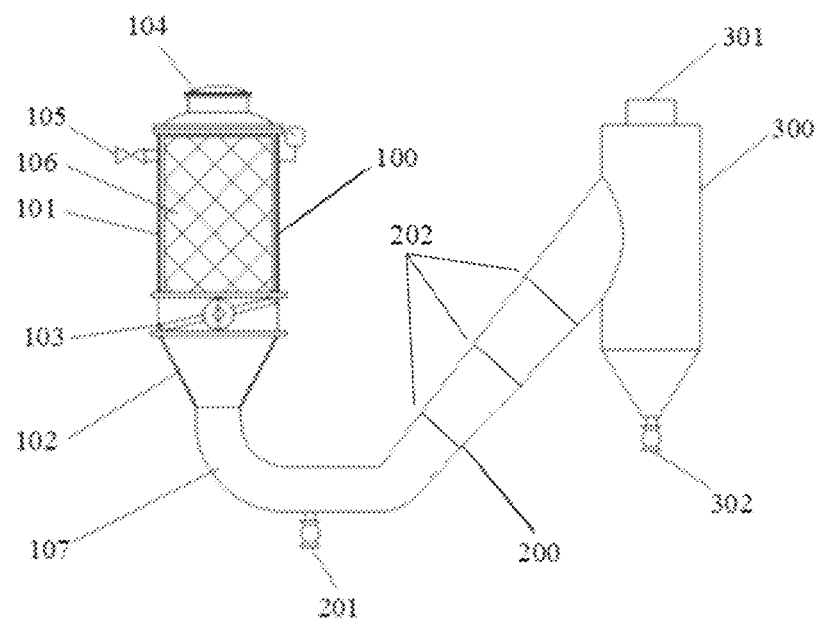
FIG. 2 is a structural diagram of the device for preparation method of instant bone milk according to the present invention.

The present invention also provides a device for preparation method of instant bone milk, as shown in FIG. 2, comprising: a high-pressure hydrolysis tank 100, comprising a hydrolysis chamber 101 and a collection chamber 102 penetrating from top to bottom, wherein the hydrolysis chamber 101 and the collection chamber 102 are connected with a quick-opening valve 103, the top of the hydrolysis chamber 101 is provided with a feed port 104 and an intake valve 105, the hydrolysis chamber 101 is provided with a charging basket 106, and the bottom of the collection chamber 102 is connected with a discharge pipe 107;

a grading conveying pipe 200, the inlet end of which is connected to the discharge pipe 107, wherein the grading conveying pipe 200 is a tubular structure whose inner diameter is gradually increased, and the grading conveying pipe 200 is internally provided with a three-grade sieving plate 202, each grade sieving plate radial setting, and providing with holes, and the diameter of each grade sieving plate is arranged along the material conveying direction according to the diameter from large to small and the distribution density from sparse to dense, and grading conveying pipe 200 and the horizontal ground having a angle of 30-75 degrees, wherein the inlet end of the grading conveying pipe 200 is lower than the outlet end, and the bottom of the inlet end is provided with a slag discharge port 201;

a gas-liquid separator 300, the side wall of which is in communication with the outlet end of the grading conveying pipe 200, the top of the gas-liquid separator 300 is provided with an exhaust port 301, and the bottom is provided with a discharge port 302. The device for preparation method of instant bone milk according to the present invention completes two high-pressure hydrolysis-instantaneous pressure relief processes in the high-pressure hydrolysis tank 100. After the second hydrolysis-pressure relief is completed, the soluble material partially enters the gas-liquid separator for collection as next step through the grading conveying pipe under the pressure. During the conveying process, the grading conveying pipe 200 is conical, the speed of the material is gradually reduced. The grading conveying pipe 200 is internally provided with a three-grade sieving plate 202, and the three-stage screening plate 202 is provided with holes with the diameter from large to small and the distribution density from sparse to dense. Solid particles with different particle sizes fall into different collectors when the material passes. The bulk solid phase insoluble portion remains in the cage, so grading collection of non-liquefiable solids is achieved.

In one of the embodiments, as shown in FIG. 2, the opening speed of the quick-opening valve 103 is less than 0.1 s, and the purpose of instantaneous pressure relief has been achieved.

In one of the embodiments, as shown FIG. 2, the charging basket 106 is made of stainless steel material, the gap between the charging basket 106 and the hydrolysis chamber 101 is set to 1 to 5 cm, and the surface of the charging basket 106 is uniformly distributed with holes with diameter of 1 to 2 cm. The gap and holes are provided to evenly distribute the steam and promote steam to enter into the bone tissue under high pressure.

In one of the embodiments, as shown in FIG. 2, the pipe diameter at the outlet of the grading conveying pipe is 1.5-2 times that at the inlet.

It should be noted that the experimental methods described in the following embodiments are all conventional methods unless otherwise specified, and the reagents and materials are commercially available unless otherwise specified.

Embodiment 1

Step 1. pre-treatment of yak bone: selecting fresh yak bone that meets the hygienic standard, cleaning by running water to remove debris and blood, and crushing by bone crusher to 4 cm;

Step 2. first high-pressure hydrolysis-instantaneous pressure relief of yak bone: putting the crushed yak bone into the charging basket of the hydrolysis chamber, introducing steam into the sealed chamber, wherein the steam pressure is 1.51 MPa, time is 5 min, and instantaneously opening the quick-opening valve for pressure relief;

Step 3. second high-pressure hydrolysis-instantaneous pressure relief: closing the quick-opening valve after pressure relief, adding the composite effect enhancer comprises according to the weight percentage: 1% gum arabic, 0.1% citric acid, 0.05‰ tea polyphenol, and 3‰ propylene glycol fatty acid ester, quick introducing steam into the sealed chamber, wherein the steam pressure is 1.5 MPa, time is 15 min, and instantaneously opening the quick-opening valve for pressure relief;

Step 4. solid-liquid separation and collection: after pressure relief, materials of two high-pressure hydrolysis-instantaneous pressure relief are collected by the grading conveying pipe and the gas-liquid separator, and the insoluble solids remain in the device;

Step 5. centrifugation for degreasing, performing high-speed centrifugation of collected materials at 14000 r/min to remove liquefied non-emulsified grease;

Step 6. wet sieving: materials after centrifugation and degreasing is sieved and filtered by a 450 mesh self-cleaning filter;

Step 7. Homogenization: performing homogenization of materials after sieving and filtering, wherein the homogenization pressure is maintained at 60 MPa.

Step 8. spray drying: performing spray drying treatment of materials after homogenization to obtain powdered instant bone milk, wherein the drying temperature is 160 degree Celsius and the moisture content is maintained at 5%.

Embodiment 2

Step 1. pre-treatment of yak bone: selecting fresh yak bone that meets the hygienic standard, cleaning by running water to remove debris and blood, and crushing by bone crusher to 3 cm;

Step 2. first high-pressure hydrolysis-instantaneous pressure relief of yak bone: putting the crushed yak bone into the charging basket of the hydrolysis chamber, introducing steam into the sealed chamber, wherein the steam pressure is 1.8 MPa, time is 6 min, and instantaneously opening the quick-opening valve for pressure relief;

Step 3. second high-pressure hydrolysis-instantaneous pressure relief: closing the quick-opening valve after pressure relief, adding the composite effect enhancer comprises according to the weight percentage: 2% gum arabic, 0.3% citric acid, 0.08‰ tea polyphenol, and 4‰ propylene glycol fatty acid ester, quick introducing steam into the sealed chamber, wherein the steam pressure is 1.8 MPa, time is 18 min, and instantaneously opening the quick-opening valve for pressure relief;

Step 4. solid-liquid separation and collection: after pressure relief, materials of two high-pressure hydrolysis-instantaneous pressure relief are collected by the grading conveying pipe and the gas-liquid separator, and the insoluble solids remain in the device;

Step 5. centrifugation for degreasing, performing high-speed centrifugation of collected materials at 15000 r/min to remove liquefied non-emulsified grease;

Step 6. wet sieving: materials after centrifugation and degreasing is sieved and filtered by a 500 mesh self-cleaning filter;

Step 7. Homogenization: performing homogenization of materials after sieving and filtering, wherein the homogenization pressure is maintained at 80 MPa.

Step 8. spray drying: performing spray drying treatment of materials after homogenization to obtain powdered instant bone milk, wherein the drying temperature is 170 degree Celsius and the moisture content is maintained at 7%.

Embodiment 3

Step 1. pre-treatment of yak bone: selecting fresh yak bone that meets the hygienic standard, cleaning by running water to remove debris and blood, and crushing by bone crusher to 5 cm;

Step 2. first high-pressure hydrolysis-instantaneous pressure relief of yak bone: putting the crushed yak bone into the charging basket of the hydrolysis chamber, introducing steam into the sealed chamber, wherein the steam pressure is 2.0 MPa, time is 5 min, and instantaneously opening the quick-opening valve for pressure relief;

Step 3. second high-pressure hydrolysis-instantaneous pressure relief: closing the quick-opening valve after pressure relief, adding the composite effect enhancer comprises according to the weight percentage: 3% gum arabic, 0.5% citric acid, 0.1‰ tea polyphenol, and 5‰ propylene glycol fatty acid ester, quick introducing steam into the sealed chamber, wherein the steam pressure is 2.0 MPa, time is 15 min, and instantaneously opening the quick-opening valve for pressure relief;

Step 4. solid-liquid separation and collection: after pressure relief, materials of two high-pressure hydrolysis-instantaneous pressure relief are collected by the grading conveying pipe and the gas-liquid separator, and the insoluble solids remain in the device;

Step 5. centrifugation for degreasing, performing high-speed centrifugation of collected materials at 16000 r/min to remove liquefied non-emulsified grease;

Step 6. wet sieving: materials after centrifugation and degreasing is sieved and filtered by a 600 mesh self-cleaning filter;

Step 7. Homogenization: performing homogenization of materials after sieving and filtering, wherein the homogenization pressure is maintained at 100 MPa.

Step 8. spray drying: performing spray drying treatment of materials after homogenization to obtain powdered instant bone milk, wherein the drying temperature is 160 degree Celsius and the moisture content is maintained at 7%.

COMPARATIVE EXAMPLE 1

Step 1. pre-treatment of yak bone: selecting fresh yak bone that meets the hygienic standard, cleaning by running water to remove debris and blood, and crushing by bone crusher to 4 cm;

Step 2. first high-pressure hydrolysis-instantaneous pressure relief of yak bone: putting the crushed yak bone into the charging basket of the hydrolysis chamber, introducing steam into the sealed chamber, wherein the steam pressure is 1.5 MPa, time is 15 min, and instantaneously opening the quick-opening valve for pressure relief;

Step 3. solid-liquid separation and collection: after pressure relief, materials are collected by the grading conveying pipe and the gas-liquid separator, and the insoluble solids remain in the device;

Step 4. centrifugation for degreasing, performing high-speed centrifugation of collected materials at 14000 r/min to remove liquefied non-emulsified grease;

Step 5. wet sieving: materials after centrifugation and degreasing is sieved and filtered by a 450 mesh self-cleaning filter;

Step 6. Homogenization: performing homogenization of materials after sieving and filtering, wherein the homogenization pressure is maintained at 60 MPa.

Step 7. spray drying: performing spray drying treatment of materials after homogenization to obtain powdered instant bone milk, wherein the drying temperature is 160 degree Celsius and the moisture content is maintained at 5%.

COMPARATIVE EXAMPLE 2 selecting fresh yak bone that meets the hygienic standard, cleaning by running water to remove debris and blood, cooking at 120 degree Celsius for 30 min, removing the residual meat on the surface of the yak bone, drying, pulverizing and sieving, and then further milling by a ball mill for 10 h to obtain bone powder.

COMPARATIVE EXAMPLE 3

Step 1. pre-treatment of yak bone: selecting fresh yak bone that meets the hygienic standard, cleaning by running water to remove debris and blood, and crushing by bone crusher to 4 cm;

Step 2. first high-pressure hydrolysis-instantaneous pressure relief of yak bone: putting the crushed yak bone into the charging basket of the hydrolysis chamber, adding the composite effect enhancer comprises according to the weight percentage: 1% gum arabic, 0.1% citric acid, 0.05‰ tea polyphenol, and 3‰ propylene glycol fatty acid ester, introducing steam into the sealed chamber, wherein the steam pressure is 1.5 MPa, time is 5 min, and instantaneously opening the quick-opening valve for pressure relief;

Step 3. second high-pressure hydrolysis-instantaneous pressure relief: closing the quick-opening valve after pressure relief, quick introducing steam into the sealed chamber, wherein the steam pressure is 1.5 MPa, time is 15 min, and instantaneously opening the quick-opening valve for pressure relief;

Step 4. solid-liquid separation and collection: after pressure relief, materials of two high-pressure hydrolysis-instantaneous pressure relief are collected by the grading conveying pipe and the gas-liquid separator, and the insoluble solids remain in the device;

Step 5. centrifugation for degreasing, performing high-speed centrifugation of collected materials at 14000 r/min to remove liquefied non-emulsified grease;

Step 6. wet sieving: materials after centrifugation and degreasing is sieved and filtered by a 450 mesh self-cleaning filter;

Step 7. Homogenization: performing homogenization of materials after sieving and filtering, wherein the homogenization pressure is maintained at 60 MPa.

Step 8. spray drying: performing spray drying treatment of materials after homogenization to obtain powdered instant bone milk, wherein the drying temperature is 160 degree Celsius and the moisture content is maintained at 5%.

Yield of Bone Powder

The powdered instant bone milk prepared in Embodiment 1, Embodiment 2, and Embodiment 3 is compared with the yield of the bone powder prepared in Comparative Example 1 and Comparative Example 2, and Comparative Example 3, and the results are shown in Table 1:

TABLE 1

| | yield of bone powder (%) | | | | | |
|---|---|---|---|---|---|---|
| | Embodiment 1 | Embodiment 2 | Embodiment 3 | Comparative Example 1 | Comparative Example 2 | Comparative Example 3 |
| Yield (%) | 39.96 | 39.43 | 39.64 | 30.84 | 24.38 | 31.02 |

The results showed that the preparation method of instant bone milk utilizes two high pressure hydrolysis-instantaneous pressure relief techniques. At the same time, the composite effect enhancer is added in the process of the second high-pressure hydrolysis, and the final obtained bone powder has the highest yield. This is because the composite effect enhancer is added during the second high pressure hydrolysis to accelerate the emulsification of proteins and oils under the condition of high temperature instantaneous pressure relief, which is beneficial to form a stable emulsion. At the same time, the antioxidant can prevent protein oxidation; the addition of organic acid can promote the complete dissolution of free calcium in the bone, and chelate with polypeptide to form a stable state, which greatly increases the nutritionality of the product. At the same time, during the process of pressure relief, the bone material tissue is more easily collected during the process of spraying, which reduces the loss of instant bone milk. In the Comparative Example 3, the composite effect enhancer was added during the first high-pressure hydrolysis process, and the bone powder yield was not much different from that of the Comparative Example 1, which was mainly due to the relatively complete bone structure during the first high-pressure hydrolysis. The composite effect enhancer was difficult to fully play the role, and during the first pressure relief process, the antioxidant and other components were lost along with the liquefaction process, and the yield of the bone powder was difficult to increase.

Bone powder microstructure and particle size distribution test

Figure 3:
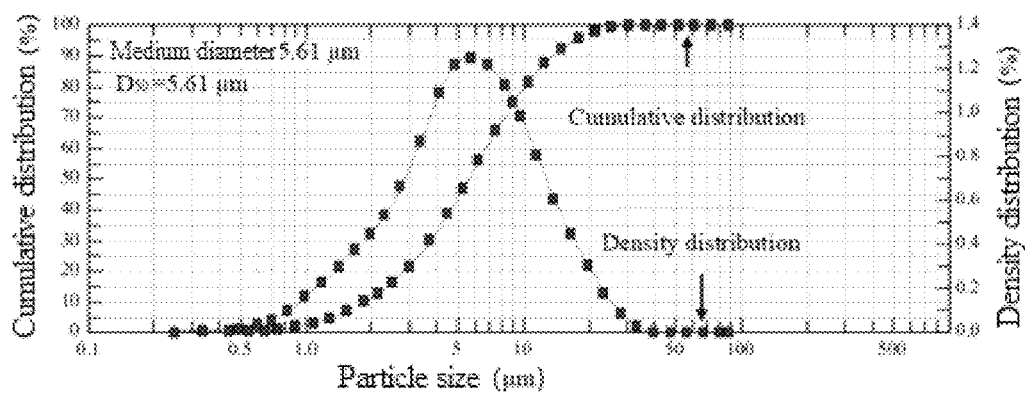
FIG. 3 is a particle size distribution diagram of the instant bone milk prepared in Embodiment 1.
Figure 4:
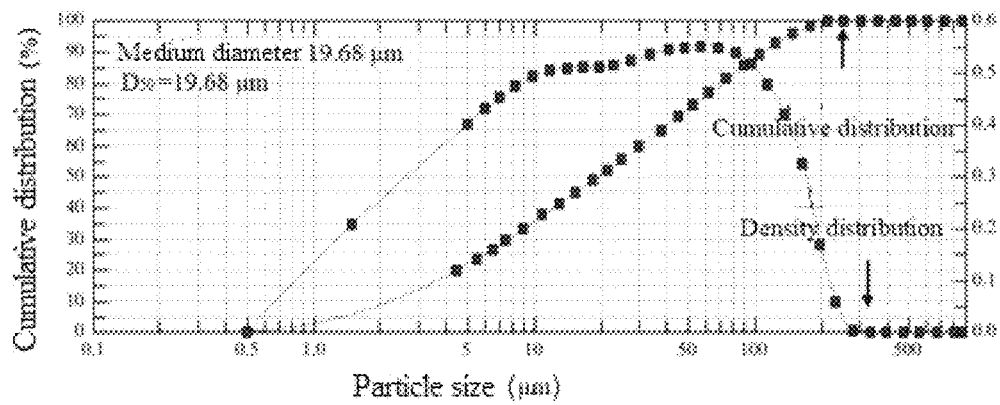
FIG. 4 is a particle size distribution diagram of bone powder prepared in Comparative Example 2.
Figure 5:
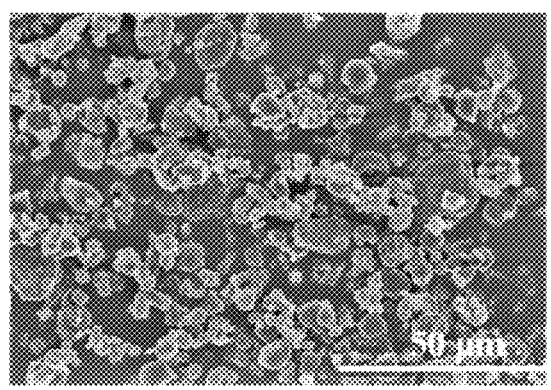
FIG. 5 is a SEM diagram of the instant bone milk prepared in Embodiment 1.
Figure 6:
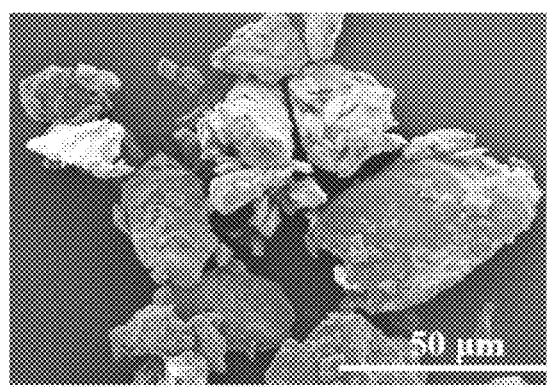
FIG. 6 is a SEM diagram of bone powder prepared in Comparative Example 2.

The particle size distributions of the bone powders prepared in Embodiment 1 and Comparative Example 2 are compared and analyzed. The particle size distribution results are shown in FIG. 3 and FIG. 4. Two high pressure hydrolysis-instantaneous pressure relief methods are used in the Embodiment 1 and simultaneously the composite effect enhancer is added. The final prepared powdered instant bone milk has a median diameter of 5.61 μm, which is significantly better than the median diameter (19.68 μm) of the bone powder prepared by conventional ball milling method in the Comparative Example 2. Moreover, the particle size of the instant bone milk prepared in the Embodiment 1 is normal distribution, and the bone powder obtained by the ball milling method is a skewed distribution, which indicates that particle size distribution of the bone powder prepared by method of the present invention is more uniform compared with the conventional ball milling method. Scanning electron microscopic showed that the instant bone milk prepared in the Embodiment 1 showed a relatively uniform spherical shape (as shown in FIG. 5), while the bone powder prepared by the ball milling method in the Comparative Example 2 is irregular particles (as shown in FIG. 6). This is consistent with the particle size distribution results. Therefore, the preparation method of the present invention produces the bone powder with finer and more uniform particle size than conventional ball milling method.

Comparison of Nutrients in Bone Powder

The basic components of the bone powder prepared in the Embodiment 1 and Comparative Example 1, Comparative Example 2, and Comparative Example 3 are shown in Table 2. The instant bone milk prepared in the Embodiment 1 is compared with the bone powder prepared in Comparative Example 1, Comparative Example 2 and Comparative Example 3, and the protein and fat contents in the instant bone milk is significantly higher ($P$ is less than 0.05); ash and water contents are significantly lower ($P$ is less than 0.05).

TABLE 2

| | main components content of bone powder (%) | | | |
|---|---|---|---|---|
| | Fat | Protein | Ash | Moisture |
| Embodiment 1 | 6.03 ± 0.87$^a$ | 47.22 ± 1.08$^a$ | 42.23 ± 1.33$^a$ | 2.17 ± 0.39$^a$ |
| Comparative Example 1 | 5.21 ± 0.78$^a$ | 37.54 ± 1.11$^a$ | 50.48 ± 1.08$^a$ | 3.26 ± 0.40$^a$ |
| Comparative Example 2 | 4.02 ± 0.16$^b$ | 30.80 ± 0.27$^b$ | 59.42 ± 0.52$^b$ | 3.7 ± 0.31$^b$ |
| Comparative Example 3 | 5.37 ± 0.37$^a$ | 37.81 ± 1.06$^a$ | 50.74 ± 1.11$^a$ | 3.38 ± 0.47$^a$ |

Note:
different letters of the same indicator indicate significant difference (P is less than 0.05)

Comparison of Bone Powder Chemical Structure

Figure 7:
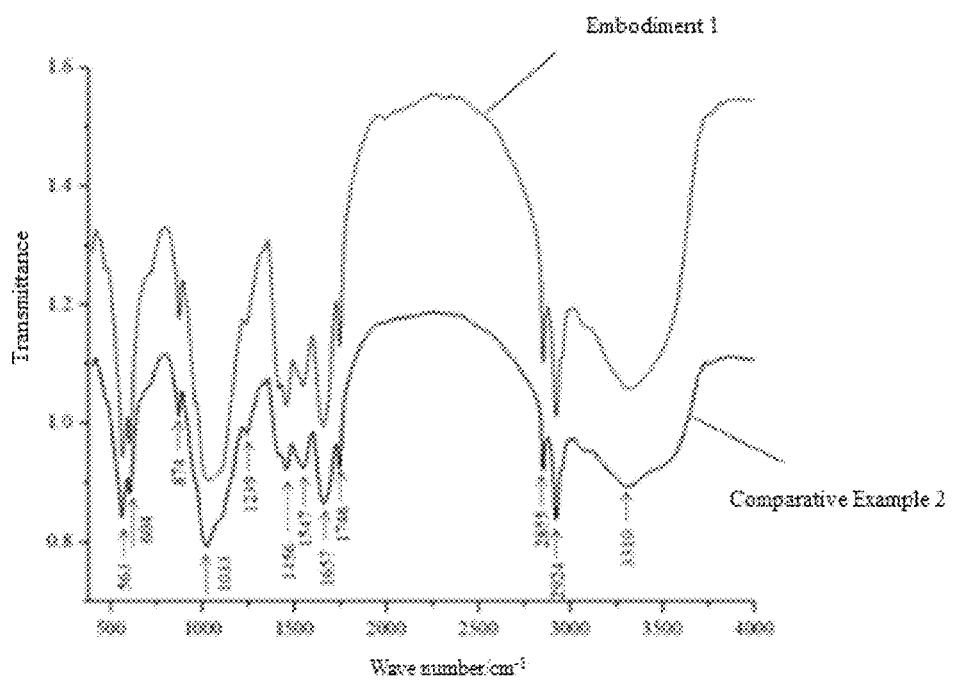
FIG. 7 is an infrared spectrum of the instant bone milk prepared in Embodiment 1 and the bone powder prepared in Comparative Example 2.

The bone powder prepared in the Embodiment 1 and Comparative Example 2 is scanned at 400-4000 cm$^{-1}$ by using a Fourier infrared tester. The infrared spectrum is as shown in FIG. 7. The results showed that the infrared scanning spectral of the instant bone milk prepared in the Embodiment 1 is in accordance with the infrared scanning spectral of the bone powder prepared by conventional ball-milling of the Comparative Example 2, which indicates that there is no difference in the chemical structure between the two materials, and the two high-pressure hydrolysis-instantaneous pressure-relief processes have no effect on the chemical structure of the bone powder.

Instant Characteristics and Sedimentation Characteristics Test

Figure 8:
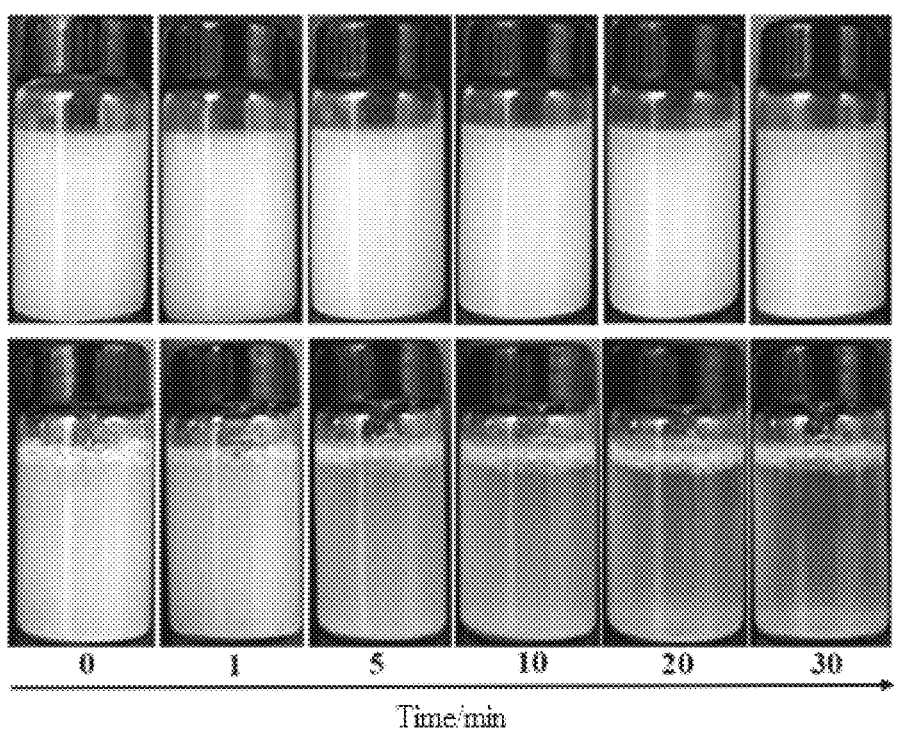
FIG. 8 is a settleability test chart of the instant bone milk prepared in Embodiment 1 and the bone powder prepared in Comparative Example 2.

The solubility of bone powder is an important indicator to measure the quality of bone powder. The solubility of bone powder prepared by conventional methods is poor. Standing the bone powder with the same concentration (3%) prepared in the Embodiment 1 and Comparative Example 2 and observing sedimentation characteristics. The results are shown in FIG. 8. The powdered instant bone milk prepared in the Embodiment 1 has good solubility and stability within 30 min, and its dissolution characteristics are obviously superior to dissolution characteristics of bone powder prepared by the conventional ball-milling in Comparative Example 2.

Protein Solubility Test

TABLE 3

| Comparison of protein solubility | | | |
|---|---|---|---|
| | 37° C. | 60° C. | 100° C. |
| Embodiment 1 (protein solubility) | 97.17% | 95.29% | 82.07% |
| Comparative Example 1 (protein solubility) | 37.41% | 32.95% | 34.43% |
| Comparative Example 2 (protein solubility) | 4.07% | 6.47% | 10.17% |

Protein solubility results of bone powder prepared in the Embodiment 1 and Comparative Example 1, Comparative Example 2 at 37° C., 60° C. and 100° C. are shown in table 3. The protein solubility of the powdered instant bone milk prepared in the Embodiment 1 is significantly higher than that of the bone powder prepared in the Comparative Example 1 and Comparative Example 2 (P is less than 0.01), which indicates that a large amount of bone protein is released and dissolved in water after two liquefaction treatments; one high-pressure hydrolysis-instantaneous pressure relief did not break the bone crystal, and the protein is still tightly bound to the hydroxyapatite. Similarly, the ball milling treatment does not break the supercoiled structure of protein in the bone, and the protein is still difficult to release.

The number of devices and processing scales described herein are intended to simplify the description of the present invention. Applicability, modifications, and variations of the present invention will be apparent to those skilled in the art.

Although embodiments of the present invention have been disclosed as above, they are not limited to the applications listed in the Specification and implementation modes. They can be applied to all kinds of fields suitable for the present invention. Additional modifications can be easily implemented for those who are familiar with the field. Therefore, the present invention is not limited to specific details and the legends shown and described herein without deviation from the general concepts confined in the Claim and the Equivalents.

What is claimed is:

1. A preparation method of instant bone milk comprising the following steps: washing edible animal bones and then crushing, using high pressure hydrolysis-instantaneous pressure relief technology, placing crushed bones under a condition of a steam pressure of 1.5-2.0 MPa for 5-10 minutes, performing instantaneous pressure relief, adding composite effect enhancer under the steam pressure of 1.5-2.0 MPa according to the weight percentage: 1 to 3% gum arabic, 0.1 to 0.5% citric acid, 0.05 to 0.1‰ tea polyphenol, 3 to 5‰ propylene glycol fatty acid ester, maintaining 15-20 min, performing instantaneous pressure relief, collecting liquid-phase materials after two high pressure hydrolysis-instantaneous pressure relief treatment, performing centrifugation for degreasing, wet sieving, homogenizing, spray drying to obtain powdered instant bone milk.

2. The preparation method of instant bone milk according to claim 1, wherein a particle size of the crushed bones is 3 to 5 cm.

3. The preparation method of instant bone milk according to claim 1, wherein the composite effect enhancer comprises according to the weight percentage: 2% gum arabic, 0.3% citric acid, 0.05‰ tea polyphenol, and 3‰ propylene glycol fatty acid ester.

4. The preparation method of instant bone milk according to claim 1, wherein homogenizing pressure is maintained at 60-100 MPa in the homogenizing process.

5. The preparation method of instant bone milk according to claim 1, wherein drying temperature is 140-180 degree Celsius, and a moisture content is maintained at 5 to 8% in the spray drying process.

* * * * *